US012729524B2

(12) United States Patent
Wick

(10) Patent No.: US 12,729,524 B2
(45) Date of Patent: Sep. 8, 2026

(54) HANDSHOWER AND DOCKING SYSTEM

(71) Applicant: Kohler Co., Kohler, WI (US)

(72) Inventor: Brian C. Wick, Kewaunee, WI (US)

(73) Assignee: Kohler Co., Kohler, WI (US)

( * ) Notice: Subject to any disclaimer, the term of this patent is extended or adjusted under 35 U.S.C. 154(b) by 246 days.

(21) Appl. No.: 18/499,919

(22) Filed: Nov. 1, 2023

(65) Prior Publication Data

US 2024/0151015 A1 May 9, 2024

Related U.S. Application Data

(60) Provisional application No. 63/423,980, filed on Nov. 9, 2022.

(51) Int. Cl.

| | |
|---|---|
| ***E03C 1/06*** | (2006.01) |
| ***B05B 1/18*** | (2006.01) |
| ***B05B 15/62*** | (2018.01) |

(52) U.S. Cl.

CPC ................ *E03C 1/06* (2013.01); *B05B 1/185* (2013.01); *B05B 15/62* (2018.02)

(58) Field of Classification Search

CPC ............ E03C 1/06; B05B 15/62; B05B 1/185

USPC ......................................... 239/282, 283, 588

See application file for complete search history.

(56) References Cited

U.S. PATENT DOCUMENTS

| | | | |
|---|---|---|---|
| 3,865,310 | A | 2/1975 | Elkins et al. |
| 7,937,784 | B2 | 5/2011 | Qiu |
| 8,651,399 | B2 | 2/2014 | Wu |
| 9,808,126 | B2 | 11/2017 | Chiu |
| 9,919,331 | B2 | 3/2018 | Scheffer et al. |
| 10,246,860 | B1 | 4/2019 | Wu et al. |
| 10,537,904 | B2 | 1/2020 | Lin et al. |
| 11,149,417 | B2 | 10/2021 | Wu et al. |
| 11,213,834 | B2 | 1/2022 | Quinn et al. |
| 11,247,223 | B2 | 2/2022 | Huang |
| 2019/0299224 | A1 | 10/2019 | Wu et al. |
| 2019/0323214 | A1 | 10/2019 | Wang et al. |
| 2019/0351444 | A1 | 11/2019 | Berlovan et al. |
| 2021/0040715 | A1 | 2/2021 | Lin et al. |
| 2021/0053083 | A1 | 2/2021 | Zhuo et al. |
| 2021/0246640 | A1 | 8/2021 | Hu et al. |
| 2021/0270020 | A1 | 9/2021 | Lin et al. |
| 2021/0293008 | A1 | 9/2021 | Lin et al. |

*Primary Examiner* — Christopher S Kim

(74) *Attorney, Agent, or Firm* — Foley & Lardner LLP

(57) ABSTRACT

A showerhead assembly includes a handshower and a docking mechanism. The handshower includes a mounting puck mountably coupled to a rear portion of the handshower. The docking mechanism is configured to receive the handshower. The docking mechanism includes a cradle assembly positioned adjacent the handshower that is configured to receive the mounting puck. The cradle assembly includes a first portion, a second portion, and a first O-ring. The second portion is adjacent the first portion. The second portion includes a face extending along a rear of the first portion. The first O-ring is provided annularly about a perimeter of the first portion and the second portion to secure the first portion and the second portion relative to one another. Upon receiving the mounting puck, the mounting puck urges the first portion into an open position to receive the mounting puck within the cradle assembly.

20 Claims, 9 Drawing Sheets

HANDSHOWER AND DOCKING SYSTEM

CROSS-REFERENCE TO RELATED APPLICATIONS

This application claims the benefit and priority to U.S. Provisional Application No. 63/423,980, filed on Nov. 9, 2022, which is incorporated herein by reference in its entirety.

BACKGROUND

The present disclosure relates generally to the field of handshowers and showerheads for use in bathing and showering. More specifically, this application relates to handshowers and showerheads having improved docking systems.

SUMMARY

At least one embodiment relates to a showerhead assembly. The showerhead assembly includes a handshower and a docking mechanism. The handshower includes a mounting puck mountably coupled to a rear portion of the handshower. The docking mechanism is configured to receive the handshower. The docking mechanism includes a cradle assembly positioned adjacent the handshower that is configured to receive the mounting puck. The cradle assembly includes a first portion, a second portion, and a first O-ring. The second portion is adjacent the first portion. The second portion includes a face extending along a rear of the first portion. The first O-ring is provided annularly about a perimeter of the first portion and the second portion to secure the first portion and the second portion relative to one another. Upon receiving the mounting puck, the mounting puck urges the first portion into an open position to receive the mounting puck within the cradle assembly.

At least one embodiment relates to a mounting assembly. The mounting assembly includes a mounting puck and a cradle assembly. The cradle assembly is configured to receive the mounting puck. The cradle assembly includes a first portion, a second portion, a first O-ring, a first post, a second post, and a second O-ring. The second portion is adjacent the first portion. The second portion includes a face extending along a rear of the first portion. The first O-ring is provided annularly about a perimeter of the first portion and the second portion to secure the first portion and the second portion relative to one another. The first post extends from the first portion. The second post extends from the second portion. The second O-ring is configured to stretch between the first post and the second post. Upon receiving the mounting puck, the mounting puck urges the first portion into an open position to receive the mounting puck within the cradle assembly.

Another embodiment relates to a mounting assembly. The mounting assembly includes a mounting puck and a cradle assembly. The mounting puck includes a first inclined surface and a second inclined surface. The cradle assembly is configured to receive the mounting puck. The cradle assembly includes a first portion, a second portion, and an O-ring. The first portion has a first engagement feature. The second portion is adjacent the first portion. The second portion includes a second engagement feature. The second portion includes a face extending along a rear of the first portion. The O-ring is provided annularly about a perimeter of the first portion and the second portion. The O-ring is configured to bias the first portion against the second portion. The cradle assembly is repositionable between an open position and a closed position. Upon insertion of the mounting puck into the cradle assembly, the first inclined surface abuts the first engagement feature to urge the first portion outward into a clearance. The second engagement feature engages the second inclined surface when the mounting puck is received within the cradle assembly.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the FIGURES, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a showerhead assembly is shown according to various exemplary embodiments. The showerhead assembly includes a handshower and a docking assembly. The handshower includes a housing, a handle extending outward from the handshower, and a mounting puck coupled to a rear portion of the handshower. The docking assembly includes a housing, a hollow channel in which a water flow may be provided therethrough, and a cradle assembly. The handshower may be reconfigured between a released position and a docked position by coupling the handshower to the docking assembly. The cradle assembly is configured to receive the mounting puck to reposition the handshower between the released position and the docked position.

The mounting puck includes one or more inclined surfaces. The inclined surfaces are coupled to one another along an exterior face of the mounting puck, and further have varying diameters that slope opposite one another. The cradle assembly may include a first portion and a second portion. The first portion includes a first engagement feature, and the second portion includes a second engagement feature. Additionally, the second portion includes a face extending along a rear side of the first portion to prohibit the first portion from repositioning out of alignment with the second portion. The cradle assembly further includes an O-ring provided around a perimeter of the cradle assembly. The O-ring is configured to bias the first portion adjacent the second portion. The cradle assembly is repositionable between an open position and a closed position by linearly repositioning the first portion relative to the second portion. Upon insertion and removal of the mounting puck within the cradle assembly, the inclined surfaces engage the first and second engagement features to urge the first portion outward thereby repositioning the cradle assembly into the open position. Once the mounting puck is fully inserted or removed, the O-ring provides an inward force to bias the first portion adjacent the second portion to reposition the cradle assembly into the closed position.

Figure 1:
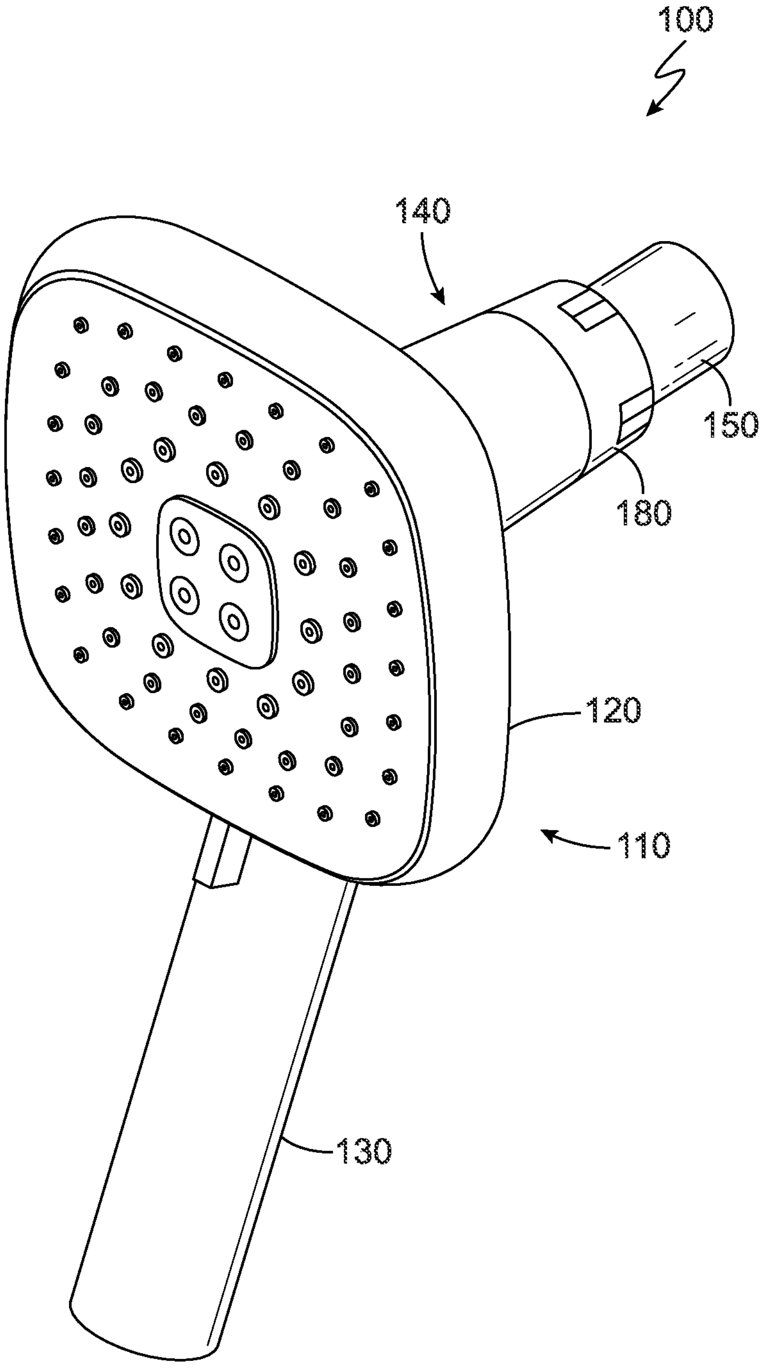
FIG. 1 is a perspective view of a handshower, according to an exemplary embodiment.
Figure 2:
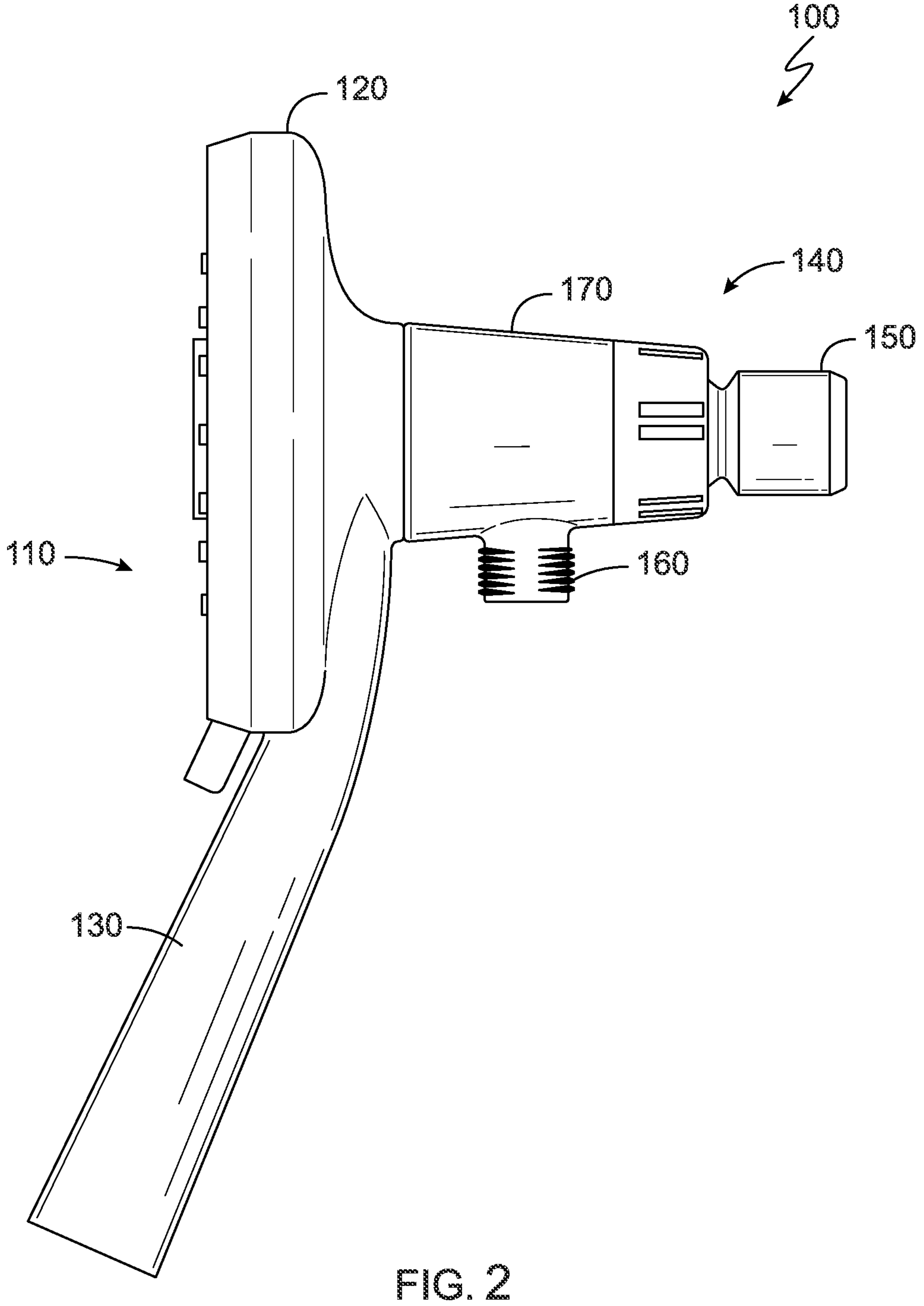
FIG. 2 is a side view of the handshower of FIG. 1, according to an exemplary embodiment.

Referring to FIGS. 1 and 2, a handshower assembly 100 is shown. The handshower assembly 100 may be used in a shower or bathing environment to provide water onto a user. The handshower assembly 100 may include a handshower 110. The handshower 110 may include a handshower housing 120. The handshower housing 120 may be configured to encase one or more components of the handshower 110 within (e.g., diverter, etc.). The handshower 110 may further include a handle 130. The handle 130 may extend from a portion of the handshower housing 120. In other embodiments, the handle 130 may be integrally formed with the handshower housing 120. The user may grasp the handle 130 to move handshower 110 within a bathing area. Although not shown, a water delivery hose (e.g., conduit, etc.) may be fluidly coupled to an end of the handle 130, opposite a spray face of the handshower 110. The water delivery hose may be a conduit configured to deliver a flow of water into the handshower 110. In other embodiments, the water delivery hose may be positioned adjacent the spray face of the handshower 110.

The handshower assembly 100 may include a docking assembly 140. The docking assembly 140 may be mounted, or otherwise coupled, to an interface, shown as ball joint 150. The ball joint 150 may be mounted to a wall of the bathing environment such that the docking assembly 140 is mounted to the wall of the bathing environment. Advantageously, the docking assembly 140 may rotate relative to the ball joint 150 to direct a water spray in a particular direction. In other embodiments, the docking assembly 140 may be coupled to the wall of the bathing environment via an alternate interface (e.g., fixed mounting interface, fastener, etc.). As shown in FIG. 2, the docking assembly 140 may include a threaded interface 160 extending from a housing 170 of the docking assembly 140. The threaded interface 160 may be configured to receive another end of the water delivery hose such that water may flow from the docking assembly 140 to the handshower 110.

Figure 9:
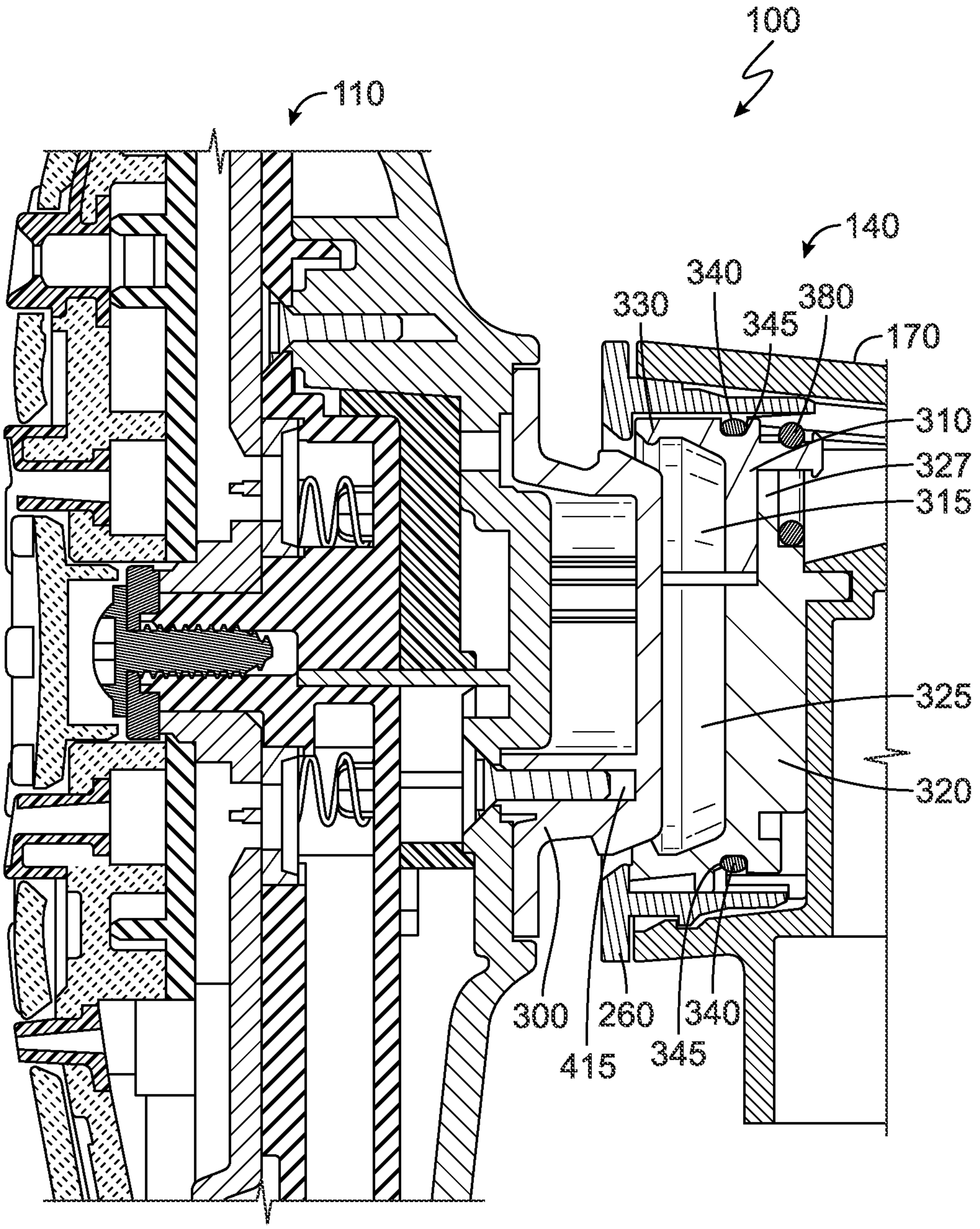
FIG. 9 is a detailed, cross-sectional view of the handshower of FIG. 1, shown in a released position, according to an exemplary embodiment.
Figure 10:
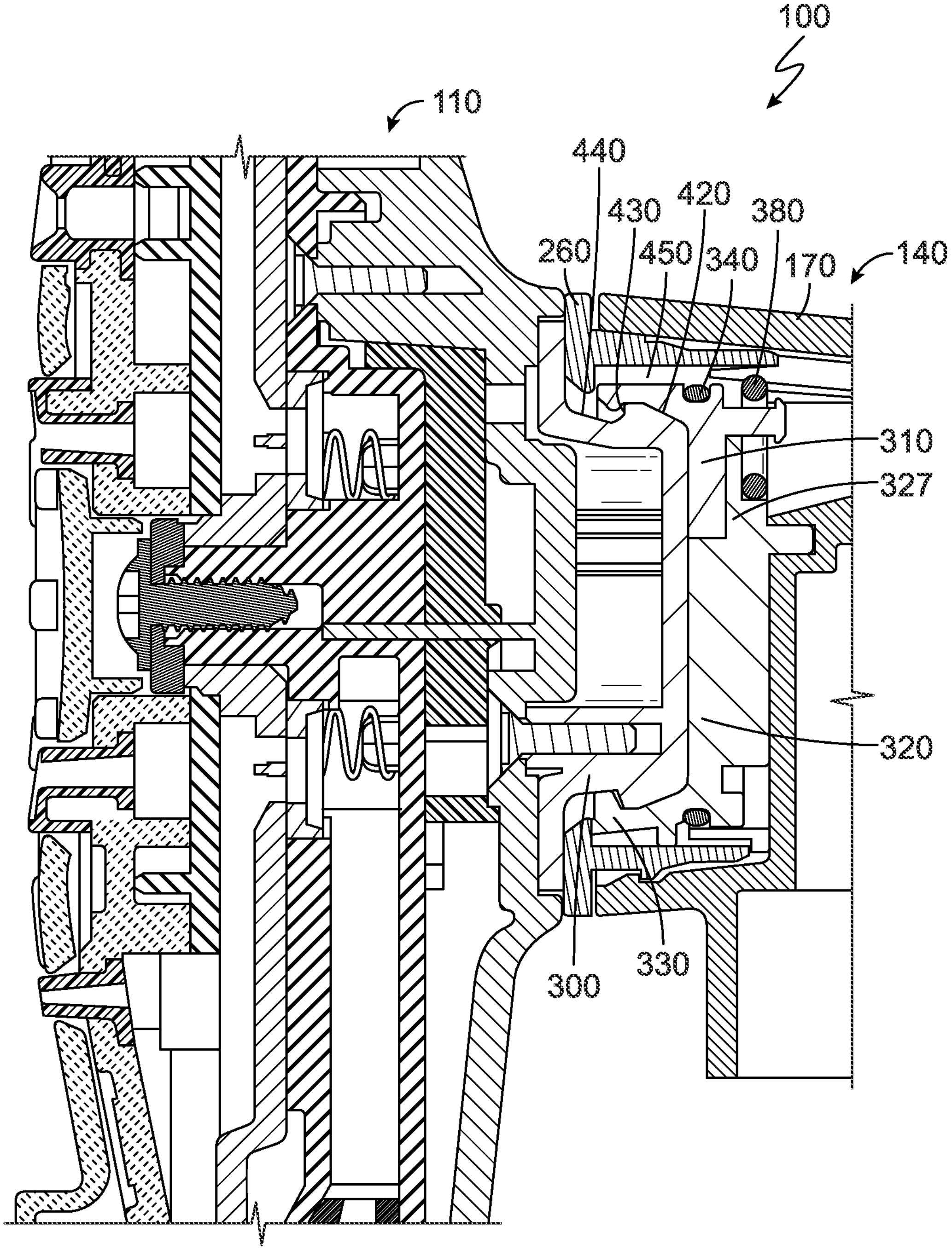
FIG. 10 is a detailed, cross-sectional view of the handshower of FIG. 1, shown in a docked position, according to an exemplary embodiment.

As shown in FIG. 2, the docking assembly 140 may engagably couple to a rear portion of the handshower 110. The handshower 110 may be positionable in a released position (as shown in FIG. 9) and a docked position (as shown in FIG. 10). The handshower 110 may be released from the docking assembly 140 to move the handshower 110 into a different location within a bathing environment. By way of example, the handshower 110 may engage with the docking assembly 140 to secure the handshower 110 within the bathing environment, or when the handshower 110 is not in use.

Figure 3:
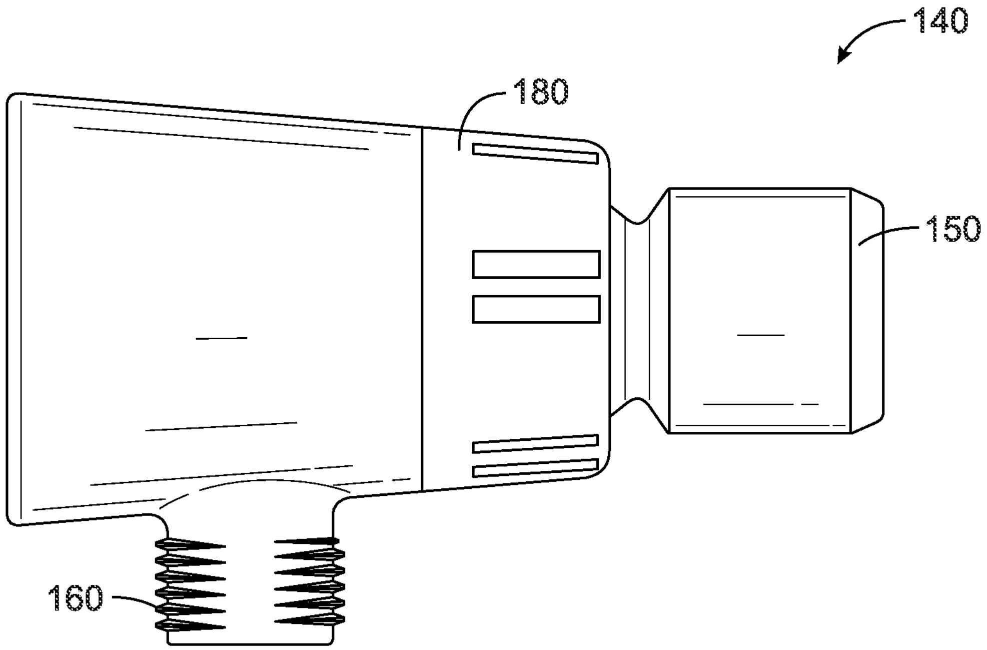
FIG. 3 is a side view of a docking assembly of the handshower of FIG. 1, according to an exemplary embodiment.
Figure 4:
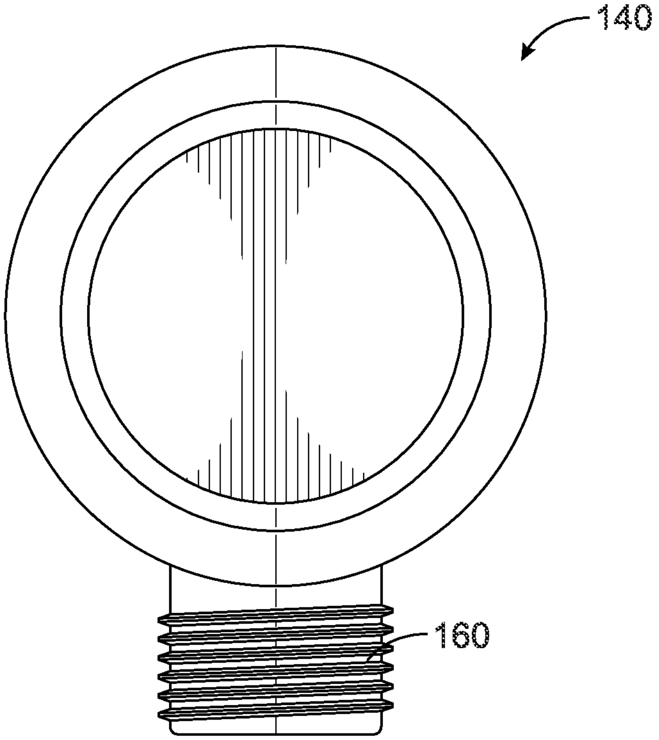
FIG. 4 is a front view of the docking assembly of FIG. 3, according to an exemplary embodiment.

Referring to FIGS. 3 and 4, the docking assembly 140 may include fastening mechanism 180. The fastening mechanism 180 may be positioned adjacent the ball joint 150, where the fastening mechanism 180 secures onto an end of the docking assembly 140 to secure the ball joint 150 to the end of the docking assembly 140. By way of example, the fastening mechanism 180 may be tightened or loosened to prohibit or permit relative movement of the docking assembly 140 about the ball joint 150. For example, when the fastening mechanism 180 is completely tightened, the docking assembly 140 may be tightly secured onto the ball joint 150 to substantially prohibit movement of the docking assembly 140. In another example, when the fastening mechanism 180 is loosened, the docking assembly 140 may be loose on the ball joint 150 to permit movement of the docking assembly 140.

Figure 5:
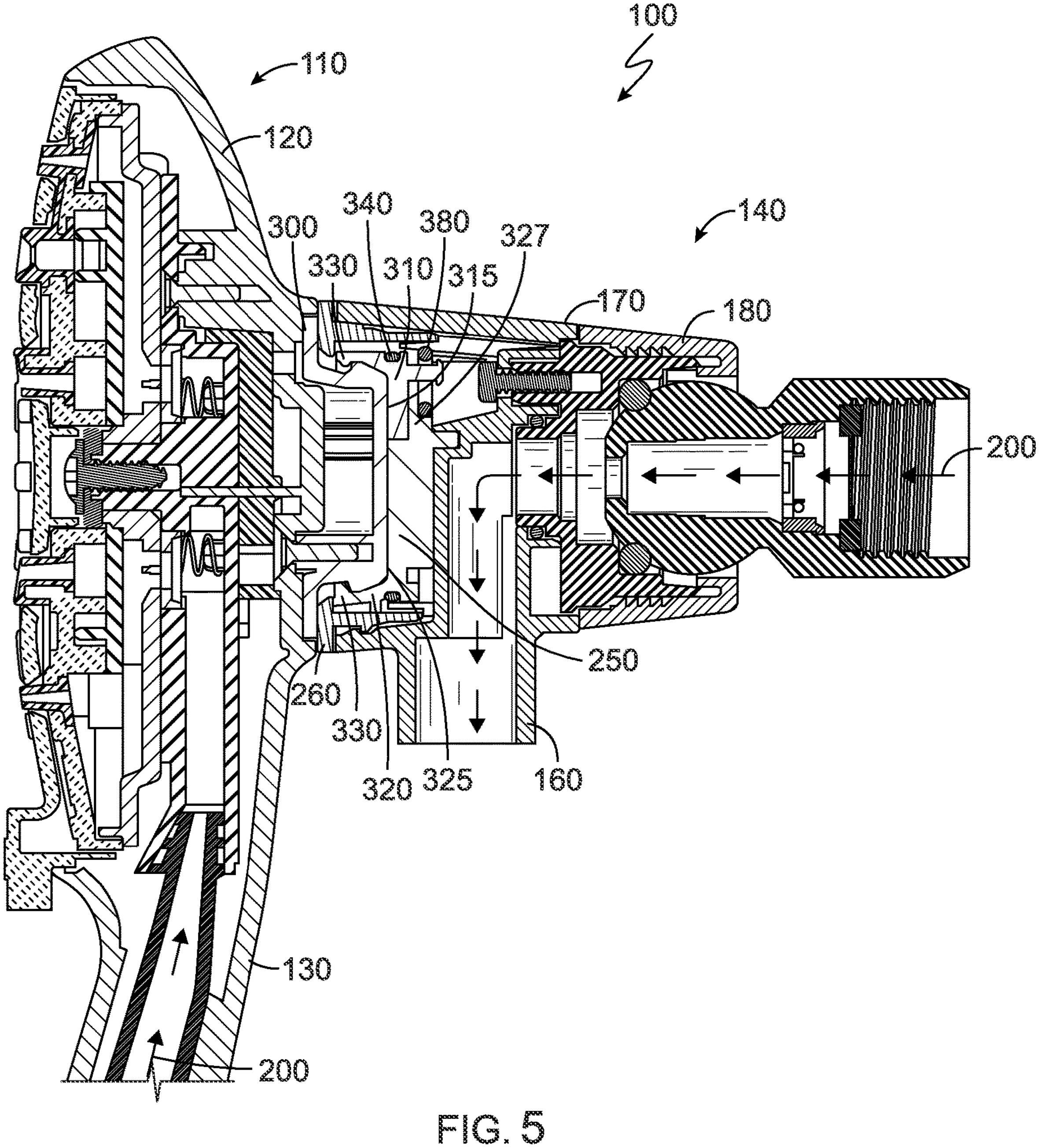
FIG. 5 is a cross-sectional view of the handshower of FIG. 1, according to an exemplary embodiment.

Referring now to FIG. 5, the handshower assembly 100 may include a water flow 200. The water flow 200 may define a direction and/or path in which water may flow. As shown, the water flow 200 is first provided through the docking assembly 140. More particularly, the water flow 200 is first provided through the ball joint 150. The ball joint 150 may include an aperture in which water may flow therethrough. From the ball joint 150, the water flow 200 is then directed through the docking assembly 140 and exits the docking assembly 140 adjacent the threaded interface 160. By way of example, a conduit is coupled to the docking assembly 140, via the threaded interface 160, where the conduit receives the water flow 200. The conduit may have a first end coupled to the threaded interface 160 and a second end that is coupled to an end of the handle 130. The water flow 200 may then be provided through the conduit, from the first end to the second end, and further directed into the handle 130. The handshower 110 may include a hollow body in which water may extend within once the water is provided through the handle 130. From the hollow body, the water flow 200 may be directed out of the handshower assembly 100 via one or more showerhead outlets.

In some embodiments, the water flow 200 may pass through a diverter system. The diverter system may be positioned within the handshower 110, the docking assembly 140, or a component before the docking assembly 140. The diverter system may be configured to selectively permit or prohibit the water flow 200. For example, the diverter system may be switched (e.g., manually, electronically, etc.) to an open position to permit the water flow 200 through the handshower assembly 100. In another example, the diverter system may be switched (e.g., manually, electronically, etc.) to a closed position to prohibit the water flow 200 through the handshower assembly 100.

Referring still to FIG. 5, the docking assembly 140 may include a cradle assembly 250. The cradle assembly 250 may be coupled to an end of the docking assembly 140, opposite the ball joint 150. In some embodiments, the cradle assembly 250 may be coupled to the docking assembly 140, adjacent the ball joint 150. The cradle assembly 250 may be secured within the docking assembly 140 via a retaining portion 260 (e.g., collar, finger, extrusion, tab, lip, rib, tooth, etc.). The retaining portion 260 may be positioned on an outer portion of the cradle assembly 250 such to encapsulate the cradle assembly 250. The retaining portion 260 may be fastened (e.g., threaded, etc.) onto the docking assembly 140. That is, the retaining portion 260 may include a threaded interface that fastens onto an inner portion of the docking assembly 140 to secure the retaining portion 260 to the docking assembly 140. The retaining portion 260 may further include an inward extending portion that, when fastened, engages a portion of the cradle assembly 250 to secure the cradle assembly 250 within the docking assembly 140. In some embodiments, the cradle assembly 250 may be secured within the docking assembly 140 via alternative methods (e.g., clearance fit, adhesive, fastener, etc.). For example, the cradle assembly 250 may be coupled to an inner portion of the docking assembly 140 via a fastener. The fastener may be received through a portion of the cradle assembly 250 and further fasten (e.g., thread, etc.) into the inner portion of the docking assembly 140 to secure the cradle assembly 250 within the docking assembly 140.

The cradle assembly 250 may be configured to receive a mounting puck 300. The mounting puck 300 may be coupled to a rear side of the handshower 110. The handshower 110 may be selectively repositionable between the docked position and the released position by the cradle assembly 250 selectively receiving the mounting puck 300. For example, when the handshower 110 is in the docked position, the mounting puck 300 is received within the cradle assembly 250 to secure the handshower 110. Accordingly, when the handshower 110 is in the released position, the mounting puck 300 is not received within the cradle assembly 250, thus permitting movement of the handshower 110 relative to the docking assembly 140.

Referring still to FIG. 5, the cradle assembly 250 may include a first cradle portion 310 and a second cradle portion 320. The first cradle portion 310 may be substantially similar to the second cradle portion 320. The first cradle portion 310 may further define a first cavity 315, and the second cradle portion 320 may further define a second cavity 325. The first cavity 315 may be an inner portion of the cradle assembly 250 defined within the first cradle portion 310, and the second cavity 325 may be an inner portion of the cradle assembly 250 defined within the second cradle portion 320. The first cradle portion 310 may be substantially different to the second cradle portion 320. In some embodiments, the first cradle portion 310 may be substantially similar to the second cradle portion 320. The first and second cradle portions 310, 320, in cooperation with the first and second cavities 315, 325, may define a geometry complimentary to a geometry to the mounting puck 300 so that the mounting puck 300 may be received within the cradle assembly 250. For example, if the mounting puck 300 defines a circular geometry, the cradle assembly 250 may define a circular geometry complimentary to that of the mounting puck 300 such that, upon receiving the mounting puck 300, the handshower 110 may be securely held. As can be appreciated, the mounting puck 300 may take on any geometrical configuration (e.g., circular, rectangular, prismatic, etc.), and, accordingly, the cradle assembly 250 may take on any geometrical configuration to compliment that of the mounting puck 300.

Figure 7:
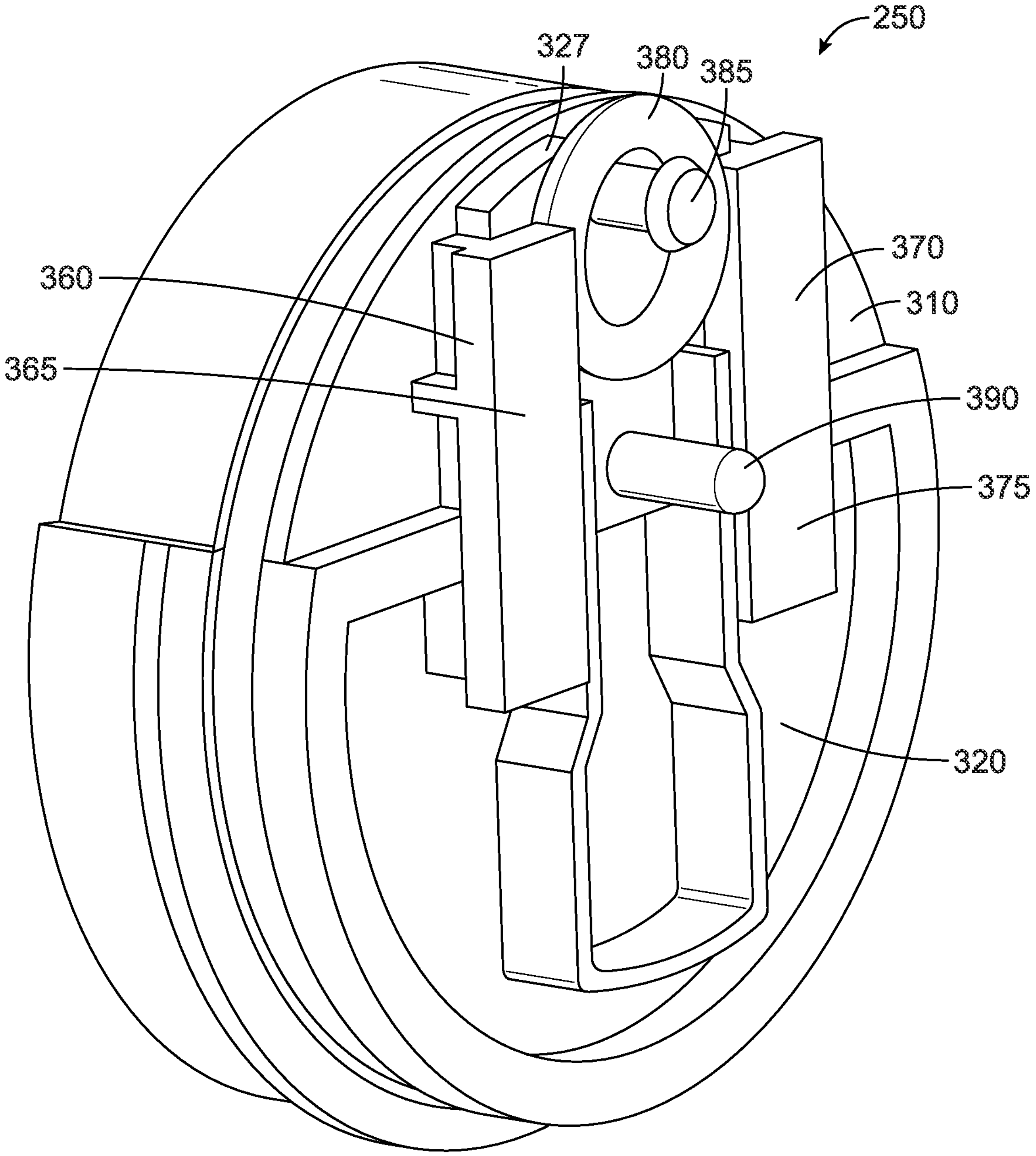
FIG. 7 is a perspective view of the cradle assembly of FIG. 6, according to an exemplary embodiment.

The second cradle portion 320 may include an extension 327 (e.g., shown best in FIG. 7). The extension 327 may be a portion of the second cradle portion 320 extending upwards along a side of the first cradle portion 310. The extension 327 may be configured to provide a backwall, or a guide, for the first cradle portion 310 to slide along. In one example, the extension 327 may extend along an entirety of the first cradle portion 310. In another example, the extension 327 may extend along a portion of the first cradle portion 310.

The cradle assembly 250 may further include one or more engagement features, shown as engagement feature 330 (e.g., finger, tab, lip, rib, collar, teeth, etc.). The engagement feature 330 may be provided along an inner surface of the cradle assembly 250. Additionally or alternatively, the engagement feature 330 may extend inward from the inner surface of the cradle assembly 250. As shown in FIG. 5, the cradle assembly 250 includes two engagement features 330. In some embodiments, the cradle assembly 250 may include more or less than two engagement features. The engagement features 330 may be positioned on a respective portion of the cradle assembly 250. For example, the cradle assembly 250 may include a first engagement feature 330 positioned on, and extending inward from, the first cradle portion 310, and a second engagement feature 330 positioned on, and extending inward form, the second cradle portion 320. The engagement features 330 may be configured to engage the mounting puck 300, when the handshower 110 is in the docked position, to secure the mounting puck 300. As can be appreciated, the first and second engagement features 330 may be positioned on opposite sides of one another such to engage the mounting puck 300 at substantially opposite sides. By way of example, the cradle assembly 250 may include any number of engagement features 330 to sufficiently secure the mounting puck 300 (e.g., two, three, four, five, six, etc.). As will be discussed further below, the engagement feature 330 may define a profile substantially similar to an engagement profile of the mounting puck 300.

The cradle assembly 250 may further include an O-ring 340 positioned around a perimeter of the cradle assembly 250. The O-ring 340 may be positioned within a recess 345. The recess 345 may be positioned within both the first cradle portion 310 and the second cradle portion 320 such that the O-ring 340 may be provided about both the first cradle portion 310 and the second cradle portion 320. The O-ring 340 may be configured to provide an inward (e.g., elastic, etc.) force onto the cradle assembly 250 to bias cradle portions (e.g., first cradle portion 310 and second cradle portion 320, etc.) together. The cradle assembly 250 may further include a second O-ring 380. The second O-ring 380 may be configured to provide additional protection from elastic creep over time.

The cradle assembly 250 may be repositionable between an open position and a closed position. The open position may be a position where the first cradle portion 310 and the second cradle portion 320 are separated such to allow a component (e.g., mounting puck 300, etc.) to be received within. Accordingly, the closed position may be a position where the first cradle portion 310 and the second cradle portion 320 abut one another. The cradle assembly 250 may be linearly repositionable to reconfigure between the open position and the closed position. More specifically, the first cradle portion 310 may linearly displace to reconfigure the cradle assembly 250 between the open position and the closed position. The O-ring 340 may be configured to bias the cradle assembly 250 in the closed position such that, upon receiving of the mounting puck 300, the cradle assembly 250 secures the mounting puck 300. In some embodiments, the cradle assembly 250 may include an additional locking component that is engaged when the cradle assembly 250 is in the closed position.

Figure 6:
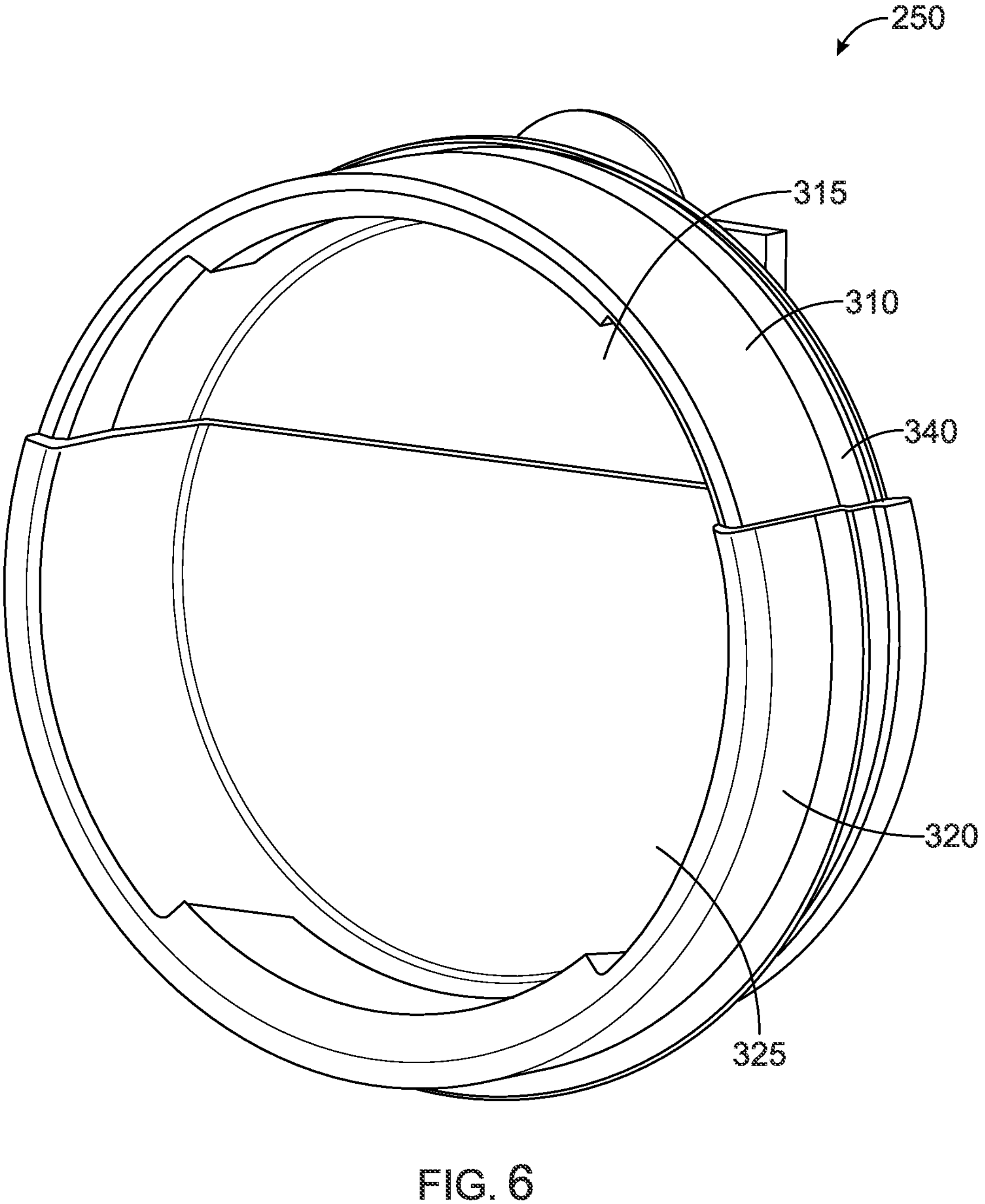
FIG. 6 is a perspective view of a cradle assembly of the handshower of FIG. 1, according to an exemplary embodiment.

Referring now to FIGS. 6 and 7, according to an exemplary embodiment, the retaining portion (e.g., retaining portion 260) may have a snap fit, clearance fit, or interference fit that, when coupled with the docking assembly 140, has at least a portion provided coextensively over a portion of the cradle assembly 250 to couple the cradle assembly 250 to the docking assembly 140. In some embodiments, the cradle assembly 250 may include one or more apertures. The aperture may be positioned on the second cradle portion 320. In some embodiments, the aperture may be positioned on the first cradle portion 310. The apertures may be through-holes configured to receive a fastener therethrough. As can be appreciated, the fastener provided through the aperture may be configured to fixedly couple the cradle assembly 250 to the docking assembly 140. By way of example, the cradle assembly 250 may include three apertures, although it can be appreciated that the cradle assembly 250 can include any number of apertures needed to couple the cradle assembly to the docking assembly 140 (e.g., one, two, four, five, six, etc.). In other embodiments, an alternate mechanism can be used to couple the cradle assembly 250 to the docking assembly 140 (e.g., adhesive, etc.).

As shown in FIG. 7, the cradle assembly 250 may further include one or more receiving extensions, tabs, fingers, protrusions, etc., shown as first receiving extension 360 and second receiving extension 370. The receiving extensions 360, 370 may be coupled to, and extend from, the first cradle portion 310. In some embodiments, the receiving extensions 360, 370 may be coupled to, and extend from, the second cradle portion 320. The receiving extensions 360, 370 may include respective inward extending portions, shown as first securement portion 365 and second securement portion 375. The securement portions 365, 375 may be portions of the receiving extensions 360, 370 that extend inward towards a center of the cradle assembly 250. The first receiving portion 360 may include the first securement portion 365, and the second receiving portion 370 may include the second securement portion 375. The securement portions 365, 375, in cooperation with the receiving extensions 360, 370 may define a pocket in which the extension 327 may extend therethrough. That is, the receiving extensions 360, 370 may be spaced apart at a distance substantially similar to a width of the extension 327, with the securement portions 365, 375 extending about a rear of the extension 327, to secure the first portion 310 to the second portion 320. As can be appreciated, the securement portions 365, 375 may prohibit the first cradle portion 310 from moving axially away from the second cradle portion 320. When the cradle assembly 250 is repositionable between the open position and the closed position, the first cradle portion 310 linearly moves relative to the second cradle portion 320, with the extension 327 prohibiting the first cradle portion 310 from moving axially away from the second cradle portion 320. The cradle assembly 250 may further include posts, tabs, fingers, protrusions, etc., shown as first post 385 and second post 390. The first post 385 may be coupled to, and extend from, the first cradle portion 310, and the second post 390 may be coupled to, and extend from, the second cradle portion 320. In some embodiments, the posts 385, 390 may be coupled to, and extend from, the first cradle portion 310. In some embodiments, the posts 385, 390 may be coupled to, and extend from, the second cradle portion 320. The second O-ring 380 may be configured to stretch between the first post 385 and the second post 390.

Figure 8:
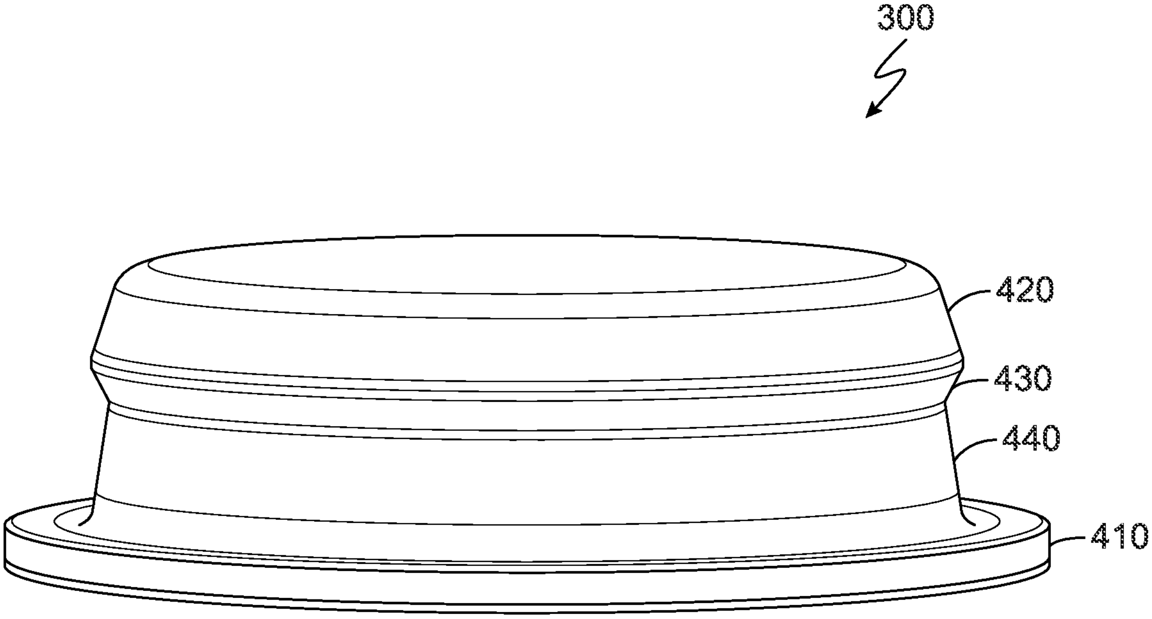
FIG. 8 is a side view of a mating puck of the handshower of FIG. 1, according to an exemplary embodiment.

Referring now to FIG. 8, the mounting puck 300 may include a mating portion 410 (e.g., extrusion, finger, tab, lip, rib, collar, etc.). The mating portion 410 may be positioned at a first end of the mounting puck 300. In some embodiments, the mating portion 410 may be positioned adjacent a midpoint of the mounting puck 300. The mating portion 410 may be configured to interface with a rear portion of the handshower 110 to couple the mounting puck 300 to the handshower 110. As shown in FIG. 9, the mounting puck 300 may include an aperture 415. The aperture 415 may extend at least partially within the mounting puck 300, and may further be configured to receive a fastener (e.g., screw, bolt, etc.) to fixedly couple the mounting puck 300 to the handshower 110. Additionally or alternatively, the mounting puck 300 may use an alternate fastening mechanism (e.g., adhesive, etc.), positioned on the mating portion 410, to couple the mounting puck 300 to the handshower 110. In other embodiments, the mounting puck 300 may be integrally formed with the handshower 110.

The mounting puck 300 may include one or more inclined surfaces to assist in repositioning the cradle assembly 250 between the open position and the closed position, shown as first inclined surface 420, second inclined surface 430, and third inclined surface 440. The first inclined surface 420 may be positioned opposite the mating portion 410. The first inclined surface 420 may be an external surface of the mounting puck 300. The first inclined surface 420 may have a diameter that varies along the length of the first inclined surface 420. For example, the first inclined surface 420 may have a diameter positioned at a first location that is less than a diameter positioned at a second location, where the second location is between the first location and the mating portion 410. In some embodiments, the diameter at the first location is greater than the diameter at the second location. In still some embodiments, the diameter is constant along the length of the first inclined surface 420.

The second inclined surface 430 may be positioned adjacent the first inclined surface 420. The second inclined surface 430 may be an external surface of the mounting puck 300. The second inclined surface 430 may have a diameter that varies along the length of the second inclined surface 430. For example, the second inclined surface 430 may have a diameter positioned at a first location that is greater than a diameter positioned at a second location, where the second location is between the first location and the mating portion 410. In some embodiments, the diameter at the first location is less than the diameter at the second location. In still some embodiments, the diameter is constant along the length of the second inclined surface 430.

The third inclined surface 440 may be positioned adjacent both the mating portion 410 and the second inclined surface 430. The third inclined surface 440 may be an external surface of the mounting puck 300. The third inclined surface 430 may have a diameter that varies along the length of the third inclined surface 430. For example, the third inclined surface 430 may have a diameter positioned at a first location that is less than a diameter positioned at a second location, where the second location is between the first location and the mating portion 410. In some embodiments, the diameter at the first location is greater than the diameter at the second location. In still some embodiments, the diameter is constant along the length of the third inclined surface 430.

Referring now to FIGS. 7 and 8, the handshower 110 may be repositioned between the released position (e.g., shown in FIG. 9) and the docked position (e.g., shown in FIG. 10). In the released position, the cradle assembly 250 may be biased, via the O-ring 340, in the closed position. Upon insertion of the mounting puck 300 into the cradle assembly 250, the mounting puck 300 provides an outward force onto the cradle assembly 250 to reposition the cradle assembly 250 into the open position. More specifically, upon insertion of the mounting puck 300, the first inclined surface 420 abuts the engagement feature 330 to urge the first cradle portion 310 upwards to reposition the cradle assembly 250 into the open position. The first cradle portion 310 may reposition into a clearance 450. The clearance 450 may be provided between an inner wall of the retaining portion 260 and an outer wall of the cradle assembly 250. The clearance 450 may provide a gap or distance in which the first cradle portion 310 may position within to reposition the cradle assembly 250 into the open position. In some embodiments, the clearance 450 may be provided between an inner wall of the housing 170 and the cradle assembly 250. In other embodiments, both the first cradle portion 310 and the second cradle portion 320 may linearly reposition to reconfigure the cradle assembly 250 into the open position.

After the engagement feature 330 extends past the first inclined surface 420, the O-ring 340 biases the cradle assembly 250 into the closed position and the mounting puck 300 is received within the cradle assembly 250. Upon full insertion of the mounting puck 300 into the cradle assembly 250, the engagement feature 330 is positioned adjacent the third inclined surface 440 via the biasing force provided by the O-ring 340. As shown in FIG. 10, both the retaining portion 260 and the engagement feature 330 may be positioned adjacent the third inclined surface 440 when the mounting puck 300 is fully received within the cradle assembly 250. That is, the third inclined surface 440 may be sized accordingly to receive both the retaining portion 260 and the engagement feature 330. As can be appreciated, having the retaining portion 260 and the engagement feature 330 tightly positioned against the third inclined surface 440 prohibits substantial movement of the handshower 110 when in the docked position.

As further shown in FIG. 10, the first cavity 315 and the second cavity 325 may be sized complimentary to a profile of the mounting puck 300 such that, when the mounting puck 300 is received within the cradle assembly, the mounting puck 300 is firmly secured. In other embodiments, the first cavity 315 and the second cavity 325 may not be sized complimentary to the mounting puck 300. For example, the cradle assembly 250 may rely solely on the spring force to maintain the handshower 110 in the docked position.

Upon removal of the mounting puck 300 from the cradle assembly 250, the user may provide a pull force onto the handshower 110 (e.g., handshower housing 120, handle 130, etc.) to remove the handshower 110 from the docked positon. When this happens, the second inclined surface is tapered as such to urge the engagement feature 330 outward. Simultaneously, the first cradle portion 310 is repositioned into the clearance 450 to permit removal of the mounting puck 300. Once the mounting puck 300 is fully removed, the first cradle portion 310 may be linearly repositioned via the O-ring 340 to reconfigure the cradle assembly 250 back in to the closed position.

Although the systems and methods herein have been described as a handshower, it can be appreciated that a similar system and method can be incorporated into an alternative application (e.g., kitchen faucet, bathroom faucet, showerhead, etc.).

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A showerhead assembly, comprising:

a handshower comprising a mounting puck coupled to a rear of the handshower; and a docking mechanism configured to receive the handshower, the docking mechanism comprising a cradle assembly configured to receive the mounting puck, the cradle assembly comprising:

a first portion;

a second portion comprising a face extending along a rear of the first portion, wherein the first portion is linearly displaceable relative to the second portion to move the cradle assembly between an open position and a closed position; and a first O-ring provided annularly about a perimeter of the first portion and the second portion to movably secure the first portion and the second portion relative to one another;

wherein, upon the cradle assembly receiving the mounting puck, the mounting puck engages with the first portion to displace the first portion relative to the second portion, such that the cradle assembly defines the open position to receive the mounting puck within the cradle assembly.

2. The showerhead assembly of claim 1, wherein the first portion further comprises a first cavity and the second portion further comprises a second cavity.

3. The showerhead assembly of claim 1, wherein the second portion further comprises an extension, wherein the extension extends along a side of the first portion, and wherein the extension is configured to provide a guide for the first portion to slide along.

4. The showerhead assembly of claim 1, wherein the cradle assembly further comprises a first engagement feature provided along an inner surface of the cradle assembly.

5. The showerhead assembly of claim 4, wherein the first engagement feature is configured to engage the mounting puck when the handshower is in a docked position.

6. The showerhead assembly of claim 5, wherein a second engagement feature is positioned on an opposite side of the cradle assembly relative to the first engagement feature and is configured to engage the mounting puck when the handshower is in the docked position.

7. The showerhead assembly of claim 6, wherein the mounting puck further comprises a first inclined surface and a second inclined surface, wherein the first inclined surface abuts the first engagement feature and the second engagement feature engages the second inclined surface when the mounting puck is received within the cradle assembly.

8. The showerhead assembly of claim 1, wherein the first portion and the second portion abut one another in the closed position.

9. The showerhead assembly of claim 8, wherein the first O-ring is configured to bias the cradle assembly from the open position to the closed position.

10. The showerhead assembly of claim 1, wherein the cradle assembly further comprises a first post and a second post, wherein the first post extends from the first portion, and wherein the second post extends from the second portion.

11. The showerhead assembly of claim 10, wherein the cradle assembly further comprises a second O-ring, wherein the second O-ring is configured to stretch between the first post and the second post.

12. A mounting assembly, comprising:
- a mounting puck coupled to a rear of a handshower; and
- a docking mechanism including a cradle assembly configured to receive the mounting puck, the cradle assembly comprising:
  - a first portion;
  - a second portion comprising a face extending along a rear of the first portion, wherein the first portion is linearly displaceable relative to the second portion to move the cradle assembly between an open position and a closed position;
  - a first O-ring provided annularly about a perimeter of the first portion and the second portion to movably secure the first portion and the second portion relative to one another;
  - a first post that extends from the first portion;
  - a second post that extends from the second portion; and
  - a second O-ring that is configured to stretch between the first post and the second post;
- wherein, upon the cradle assembly receiving the mounting puck, the mounting puck engages with the first portion to displace the first portion relative to the second portion, such that the cradle assembly defines the open position to receive the mounting puck within the cradle assembly.

13. The mounting assembly of claim 12, wherein the first portion further comprises a first cavity and the second portion further comprises a second cavity.

14. The mounting assembly of claim 12, wherein the second portion further comprises an extension, wherein the extension extends along a side of the first portion, and wherein the extension is configured to provide a guide for the first portion to slide along.

15. The mounting assembly of claim 12, wherein the cradle assembly further comprises a first engagement feature provided along an inner surface of the cradle assembly.

16. The mounting assembly of claim 15, wherein the first engagement feature is configured to engage the mounting puck when the mounting puck is in a docked position, and wherein, in the docked position, the mounting puck is received within the cradle assembly.

17. The mounting assembly of claim 16, wherein a second engagement feature is positioned on an opposite side of the cradle assembly relative to the first engagement feature and is configured to engage the mounting puck when the mounting puck is in the docked position.

18. The mounting assembly of claim 12, wherein the first portion and the second portion abut one another in the closed position.

19. The mounting assembly of claim 18, wherein the first O-ring is configured to bias the cradle assembly from the open position to the closed position.

20. A mounting assembly, comprising:
- a mounting puck coupled to a rear of a handshower, the mounting puck comprising:
  - a first inclined surface; and
  - a second inclined surface; and
- a docking mechanism including a cradle assembly configured to receive the mounting puck, the cradle assembly comprising:
  - a first portion having a first engagement feature;
  - a second portion having a second engagement feature and a face extending along a rear of the first portion, wherein the first portion is linearly displaceable relative to the second portion to move the cradle assembly between an open position and a closed position; and
  - an O-ring provided annularly about a perimeter of the first portion and the second portion to movably secure the first portion and the second portion relative to one another, the O-ring configured to bias the cradle assembly from the open position to the closed position;
- wherein, upon-insertion of the mounting puck into the cradle assembly receiving the mounting puck, the first inclined surface of the mounting puck abuts the first engagement feature of the cradle assembly to urge the first portion outward relative to the second portion, and wherein the second engagement feature of the cradle assembly engages the second inclined surface of the mounting puck when the mounting puck is received within the cradle assembly.

* * * * *